United States Patent
Johnson et al.

(10) Patent No.: US 10,180,839 B2
(45) Date of Patent: Jan. 15, 2019

(54) APPARATUS FOR INFORMATION PROCESSING WITH LOOP CACHE AND ASSOCIATED METHODS

(71) Applicant: Silicon Laboratories Inc., Austin, TX (US)

(72) Inventors: Mark W. Johnson, Austin, TX (US); Paul Zavalney, Austin, TX (US); Marius Grannæs, Oslo (NO); Oeivind A. G. Loe, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 141 days.

(21) Appl. No.: 15/061,018

(22) Filed: Mar. 4, 2016

(65) Prior Publication Data

US 2017/0255467 A1   Sep. 7, 2017

(51) Int. Cl.
| | |
|---|---|
| *G06F 9/40* | (2006.01) |
| *G06F 12/12* | (2016.01) |
| *G06F 9/30* | (2018.01) |
| *G06F 9/32* | (2018.01) |
| *G06F 12/0875* | (2016.01) |
| *G06F 9/38* | (2018.01) |
| *G06F 12/121* | (2016.01) |

(52) U.S. Cl.
CPC ......... *G06F 9/30047* (2013.01); *G06F 9/325* (2013.01); *G06F 9/30065* (2013.01); *G06F 9/381* (2013.01); *G06F 9/3806* (2013.01); *G06F 12/0875* (2013.01); *G06F 12/121* (2013.01); *G06F 2212/452* (2013.01)

(58) Field of Classification Search
CPC ...... G06F 9/30047; G06F 9/325; G06F 9/381; G06F 12/0875; G06F 12/121; G06F 12/122; G06F 12/123; G06F 2212/452; G06F 2212/6022; G06F 9/30065
USPC .................. 712/241–243; 711/125, 133–136
See application file for complete search history.

(56) References Cited

U.S. PATENT DOCUMENTS

| | | | | |
|---|---|---|---|---|
| 4,833,599 | A * | 5/1989 | Colwell | G06F 9/264 712/236 |
| 5,920,890 | A * | 7/1999 | Moyer | G06F 9/381 711/141 |
| 7,392,370 | B2 * | 6/2008 | Dewitt, Jr. | G06F 9/30181 700/78 |
| 8,108,859 | B2 * | 1/2012 | Yokoi | G06F 9/3851 711/125 |
| 2004/0193858 | A1 * | 9/2004 | Ahmad | G06F 9/325 712/241 |
| 2014/0095800 | A1 | 4/2014 | Biswas et al. | |
| 2015/0089155 | A1 * | 3/2015 | Busaba | G06F 12/0815 711/141 |

(Continued)

OTHER PUBLICATIONS

Susan Cotterell et al., *Tunin gof Loop Cache Architecture to Programs in Embedded System Design*, JSSS'02, IEEE, 2002.

(Continued)

*Primary Examiner* — Daniel H Pan
(74) *Attorney, Agent, or Firm* — Law Offices of Maximilian R. Peterson

(57) ABSTRACT

An apparatus includes a processor and a loop cache coupled to the processor. The loop cache provides to the processor instructions corresponding to a loop in the instructions. The loop cache includes a persistence counter.

20 Claims, 8 Drawing Sheets

(56) References Cited

U.S. PATENT DOCUMENTS

2016/0041927 A1* 2/2016 Jung .................. G06F 12/0864
                                                                711/135

OTHER PUBLICATIONS

Marisha Rawlins et al., *On the Interplay of Loop Caching, Code Compression, and Cache Configuration*, ASPDAC'11, 2011.
Marisha Rawlins et al., *On the Interplay of Loop Caching, Code Compression, and Cache Configuration*, ASPDAC'11, IEEE, 2011.
Ann Gordon-Ross et al., *Exploiting Fixed Programs in Embedded Systems: A Loop Cache Example*, IEEE Computer Architecture Letters, 2002.
Susan Cotterell et al., *Tunin gof Loop Cache Architecture to Programs in Embedded System Design*, JSSS'02, 2002.

* cited by examiner

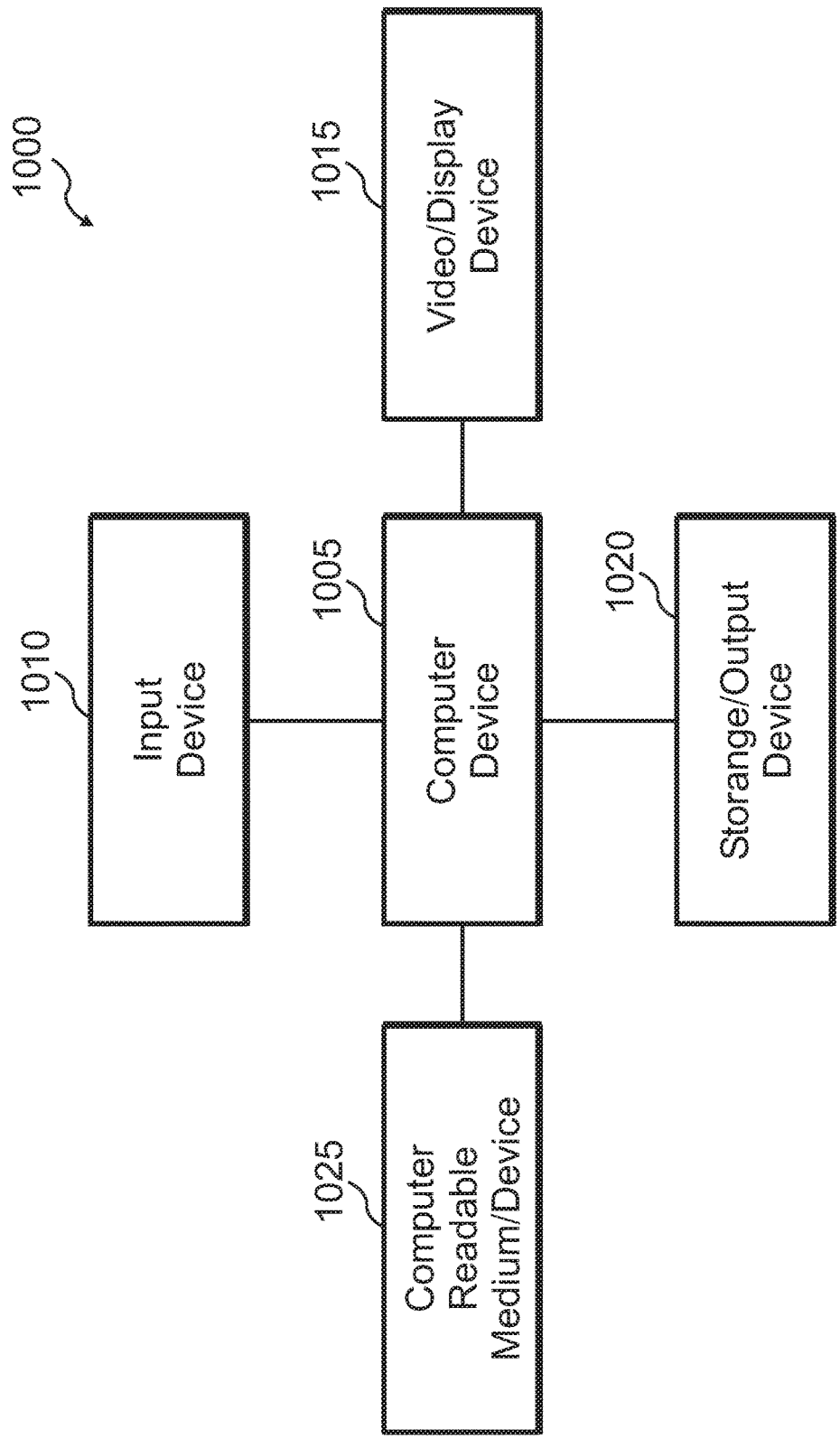

APPARATUS FOR INFORMATION PROCESSING WITH LOOP CACHE AND ASSOCIATED METHODS

TECHNICAL FIELD

The disclosure relates generally to memory apparatus and, more particularly, to apparatus for loop cache (or interchangeably "loop cache memory"), and associated methods.

BACKGROUND

Advances in information processing has resulted in increasing demands for processing power. Examples include faster and more capable processors, faster graphics or video hardware, and faster and larger memory.

Because of a variety of factors, faster memory tends to cost more. Because of the relatively large cost of fast memory, system memory is typically divided into several types of memory. One type of memory constitutes the main memory of a system. The main memory, as the name suggests, provides a storage subsystem for storing information, such as data, instructions, etc., and reading the stored contents of the memory. Another type of memory is cache memory. Cache memory is often faster than main memory. As noted above, however, faster memory tends to cost more. As a result, cache memory, although faster, is provided in smaller amounts than main memory.

The description in this section and any corresponding figure(s) are included as background information materials. The materials in this section should not be considered as an admission that such materials constitute prior art to the present patent application.

SUMMARY

A variety of loop cache (or loop cache memory) apparatus and associated methods are contemplated. According to an exemplary embodiment, an apparatus includes a processor and a loop cache coupled to the processor. The loop cache provides to the processor instructions corresponding to a loop in the instructions. The loop cache includes a persistence counter.

According to another exemplary embodiment, a microcontroller unit (MCU) includes a processor to receive and execute a set of instructions. The MCU further includes a loop cache. The loop cache includes a storage circuit to store instructions corresponding to a loop in the set of instructions. The loop cache further includes a persistence counter to count down from a persistence factor.

According to another exemplary embodiment, a method of processing information includes executing instructions using a processor. The method further includes using a loop cache to provide to the processor instructions corresponding to a loop in the instructions by using a persistence counter.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

FIG. 8 shows a block diagram of a computer system for information processing according to an exemplary embodiment.

DETAILED DESCRIPTION

Figure 1:
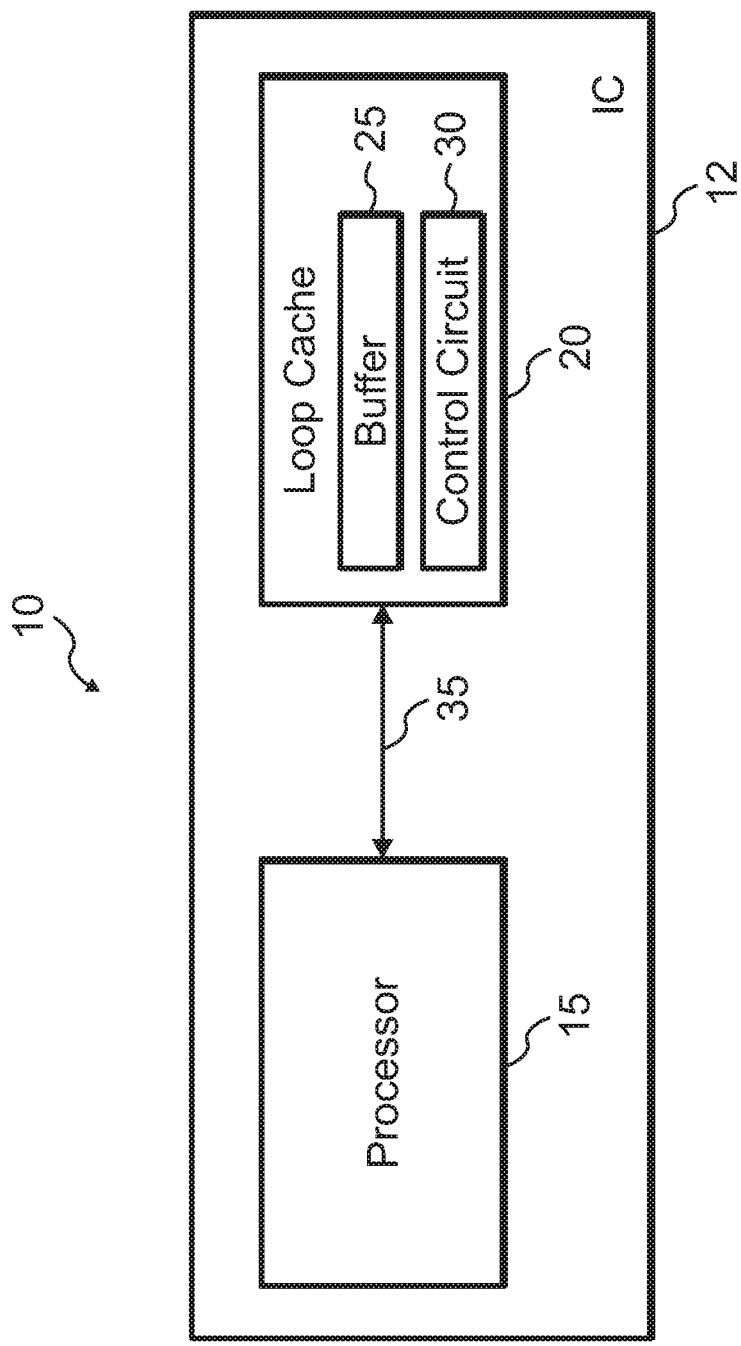
FIG. 1 illustrates a circuit arrangement for information processing using a loop cache according to an exemplary embodiment.

The disclosed concepts relate generally to memory apparatus, as used, for example, in information processing systems or apparatus. More specifically, the disclosed concepts provide apparatus and methods for loop cache (or loop cache memory). A processor (e.g., a central processing unit (CPU)) performs a task by executing instructions. The instructions are typically included in code (or code segment(s)), such as program instructions and data, for a program, subroutine, module, etc. A loop cache, or loop cache memory, according to exemplary embodiments includes a relatively small buffer used to avoid accessing another storage device or memory, such as a larger and/or slower cache (or cache memory), a larger and/or slower main memory, etc. The relatively small buffer in the loop cache consumes less power than a larger cache or main memory, which is advantageous, particularly in mobile applications or where relatively small amounts of power are available. More specifically, a loop cache may be used to store code. The program code pertains to loop(s) or iterative sequence(s) of instructions (including data, if included or desired).

A processor typically sequentially increments through addressable memory (e.g., using a program counter (PC)), executing instructions until it conditionally continues the sequential flow or jumps to a non-sequential address, thus starting a new sequential flow. Some operations entail the same sequential series of instructions to be executed more than once, i.e., include a loop. In a loop, the processor executes the same series of instructions until a loop exit condition is reached. The task to be performed, and how it is coded or programmed, determine the overall structure of the code.

For instance, the well-known "for" loop includes the "for" instruction that signals the beginning of the loop, a body of the loop (including code, e.g., program instructions and data, as desired), and a statement, token, or indicator that signals the end of the loop. At run time, the body of the loop is executed a given number of times, as specified by the "for" instruction. Other constructs may also include a loop or might be suitable for inclusion in a loop cache. Examples include jump (sometimes known as "go to" or "goto") instructions, conditional instructions (typically resulting in jumps in code when compiled), conditional jump instructions, etc. A loop may also be used to buffer code in cases where the working set is relatively small. In some exemplary embodiments, a loop cache is used to buffer code for relatively simple loops, e.g., loops that have one sequential run that fit within the loop cache. Such a loop cache can be used to reduce access to other storage devices or circuits, such as the next tier of cache, main memory, etc.

In exemplary embodiments, loop cache use the concept of persistence, e.g., a persistence factor, as described below in detail. The concept of persistence allows the loop cache to partially buffer more complex scenarios, thereby extending its utility beyond a first-order implementation. By using relatively small amounts of hardware for the loop cache, the percentage of instructions the loop cache can buffer can be increased by allowing a persistent factor to hold off replacement of the loop cache contents until the loop code or segment being buffered has not been accessed recently, and historically is less likely to be used or called soon.

A loop cache attempts to create a smaller buffer or the smallest possible buffer to execute a common sequence of instructions for a processor, i.e., the loop. The mix of loops and the number of sequential instructions within that loop vary, depending on factors such as the type of task, the type of program, the processor's hardware, the information processing system's software (e.g., assembler, compiler, etc.).

A number of scenarios in information processing, such as the manipulation of information or data using a computer, processor, etc., may benefit from using a loop cache. As one example, using a loop cache allows the processor to "escape" a loop (suspend, to put on hold, postpone, etc.) momentarily to execute another thread, request, code, code segment(s), such as an interrupt request (IRQ). As another example, the processor might speculatively fetch a branch address (thus non-sequential and technically out of the loop being executed) that ends up not being taken. (An example of such a scenario arises if the loop start indicator is specified as any non-sequential address.) Using a loop cache would allow the processor to access the loop code in the loop cache, rather than in another storage device or circuit, such as the main memory. As another example, nested loops might benefit from using a loop cache. If the processor momentarily exits an inner loop to increment an outer loop variable, but quickly returns to the inner loop that represents that majority of the instructions in a given code segment, using a loop cache would speed up program execution.

FIG. 1 illustrates a circuit arrangement 10 for information processing using a loop cache according to an exemplary embodiment. In the example shown, in integrated circuit (IC) 12 includes a processor 15 coupled to loop cache 20 via link 35. Processor 15 may include any desired type of processor circuitry. For example, in some embodiments, processor 15 may constitute a CPU. In some embodiments, processor 15 may constitute a state machine, such as a finite state machine (FSM). In some embodiments, processor 15 may perform logic, arithmetic, and/or data manipulation tasks, as desired. In some embodiments, processor 15 may constitute a microprocessor or microcontroller unit (MCU). In some embodiments, processor 15 may constitute a reduced instruction set computer (RISC) or, conversely, in other embodiments, a complex instruction set computer (CISC). Other possibilities are contemplated and may be used depending on factors such as specifications for a given implementation, cost, available technology, etc., as persons of ordinary skill in the art will understand.

Loop cache 20 includes buffer 25 and control circuit 30. Buffer 25 constitutes the storage circuit or block for loop cache 20, sometimes known as the memory or storage used in loop cache 20 to store code. Generally, any desired storage device may be used, such as a memory circuit, depending on factors such as specifications for a given implementation (e.g., speed, latency), cost, available technology, area (how much of the floor plan of IC 12 is used), etc., as persons of ordinary skill in the art will understand. In some embodiments, static random access memory (SRAM) may be used. In some embodiments, registers or flip-flops may be used, depending on the desired performance characteristics of loop cache 20.

Control circuit 30 controls various operational aspects of loop cache 25. In some embodiments, control circuit 30 couples to and communicates with processor 15 via link 35. Through link 35, status, control, and/or data (generally, information) may be communicated. In some embodiments, circuitry (e.g., persistence counter or counter (not shown) or other circuitry (not shown) to implement or use persistence factors) may be used in control circuit 30 to implement cache loops that use persistence factors, as described below in detail. Control circuit 30 may be implemented in a number of ways, as desired, depending on factors such as specifications for a given implementation, cost, available technology, etc., as persons of ordinary skill in the art will understand. In some embodiments, control circuit 30 may be implemented as an FSM. In some embodiments, control circuit 30 may be implemented using general logic circuitry, such as gates, registers, flip-flops, counters, etc. In some embodiments, control circuit 30 may be implemented using standard cells, as desired. In some embodiments, control circuit 30 may be implemented using special-purpose or optimized logic, as desired.

Link 35 may have a variety of forms, as persons of ordinary skill in the art will understand. In some embodiments, link 35 constitutes a dedicated interface or coupling mechanism, for example, a coupling mechanism or link that has relatively low latency or delay in order to provide relatively high throughput between processor 15 and loop cache 20. In some embodiments, link 35 constitutes a bus. The bus may be used mainly by processor 15 and loop cache 20, or may be shared with other components, blocks, or circuits (not shown). The nature, structure, use, and implementation of the bus depend on a number of factors (e.g., the number of devices that use the bus, speed of operation of the devices, etc.), as persons of ordinary skill in the art will understand.

Figure 2:
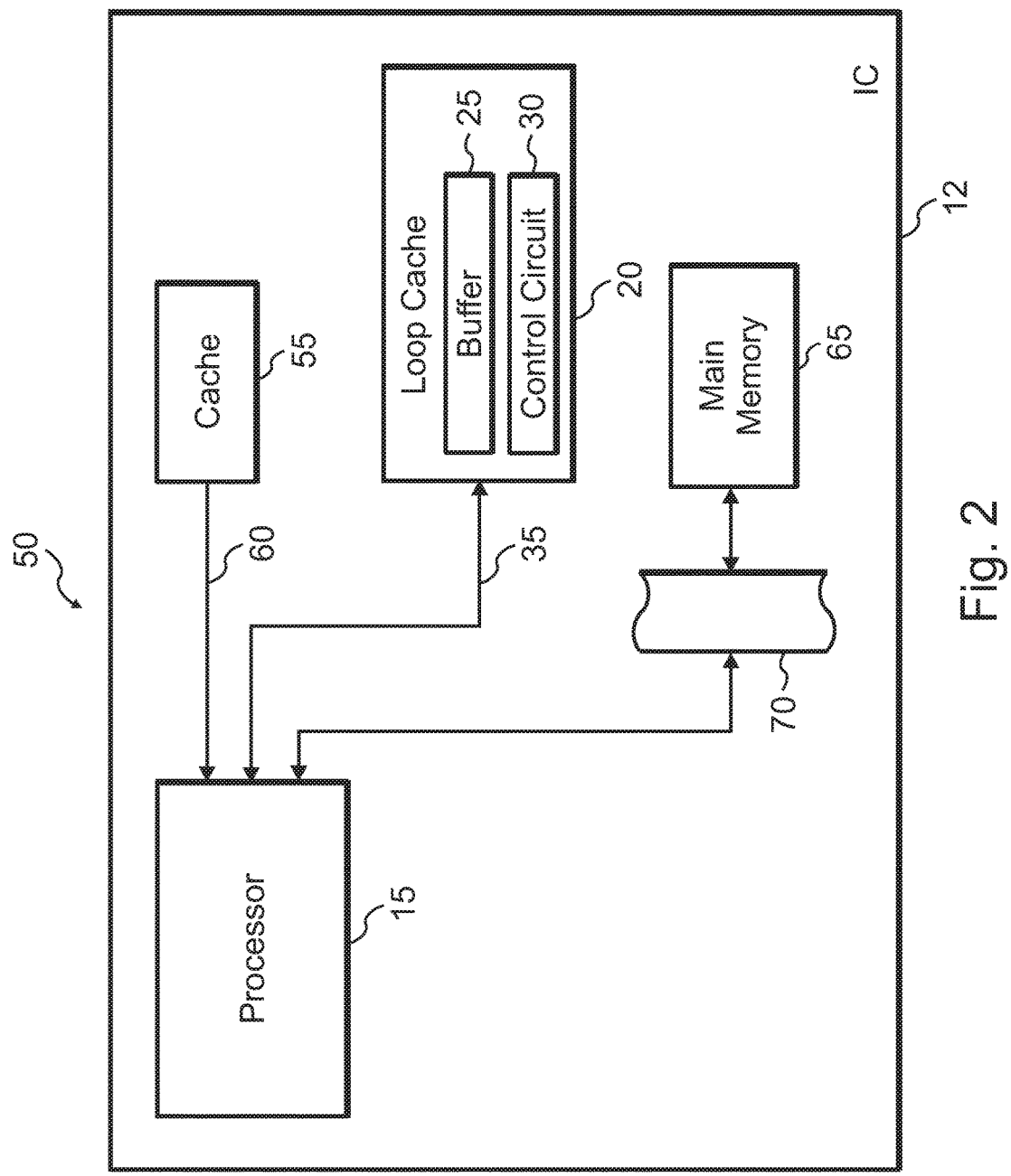
FIG. 2 depicts a circuit arrangement for information processing using a loop cache according to another exemplary embodiment.

FIG. 2 depicts a circuit arrangement 50 for information processing using a loop cache according to another exemplary embodiment. Circuit arrangement 50 is similar to the exemplary embodiment shown in FIG. 1 in that includes processor 15, loop cache 20, and link 35. In addition, circuit arrangement 50 includes cache 55, coupled to processor 15 via link 60. Cache 55 may constitute a cache that caches code not within loops, e.g., a general-purpose cache or a special-purpose (other than caching loops) cache, the next tier cache (to loop cache 20), etc., as desired. Link 60 may be implemented in a variety of ways, such as those described above with respect to link 35.

Furthermore, circuit arrangement 50 includes main memory 65, coupled to processor 15 via link 70. Main memory 65 generally provides the bulk of the storage for processor 15 (or more broadly, for the information processing system), as persons of ordinary skill in the art will understand. Thus, main memory 65 may provide more storage locations (and/or different widths, sizes, words, etc.) than loop cache 20 or cache 55. In addition, as noted above, the relatively small buffer in the loop cache consumes less power than a larger cache or main memory, which is advantageous, particularly in mobile applications or where relatively small amounts of power are available. Generally speaking, main memory 65 is slower than cache 55 and/or loop cache 20. In other words, main memory 65 represents a tradeoff between size, power consumption, and speed of storage circuitry by providing larger storage, although at slower speed and higher power consumption. Link 60 may be implemented in a variety of ways, such as those described above with respect to link 35.

Note that FIGS. 1-2 depict merely illustrative block diagrams of information processing systems. Depending on factors such as design and performance specifications, cost, available technology, etc, circuit arrangements 10 and 50 may include other blocks, circuits, systems, subsystems, and the like, as desired, and as persons of ordinary skill in the art will understand. An example of an IC that includes additional circuitry is shown in FIG. 8, and described below in detail. As another example, in some embodiments, loop cache 20 may extend to multiple instances of branches or loops (e.g., having the capability of handling different loops or branches). As an alternative, in some embodiments, a single controller, such as control circuit 30, may manage multiple buffers, rather than a single buffer 25. Such variations and alternatives may be accommodated by modifying, extending, and/or copying of the hardware, firmware, and/or software (or a combination of the foregoing) used to implement buffer 25 and/or control circuit 30, as persons of ordinary skill in the art will understand.

Figure 3:
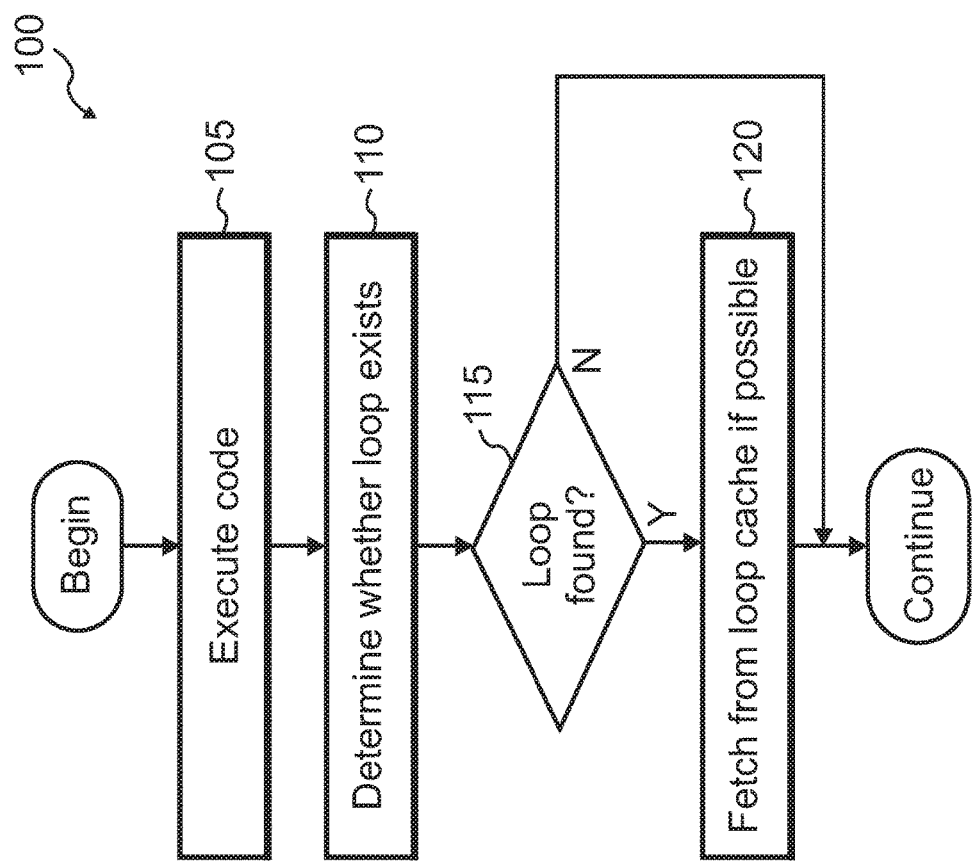
FIG. 3 shows a flow diagram for a process of using a loop cache according to an exemplary embodiment.

FIG. 3 shows a flow diagram 100 for a process of using a loop cache according to an exemplary embodiment. At 105, code is executed, for example, by using processor 15 (see, for example, FIGS. 1-2). As part of this operation, code may be fetched, decoded, etc., as persons of ordinary skill in the art will understand. At 110, a determination is made whether a loop exists within the code, e.g., within the instructions/data included within the code. A variety of techniques exist for performing this process, as described below. In some embodiments, such as using a compiler or assembler, the determination regarding the existence of a loop is made before executing the code. In those situations, the code corresponding to the loop might be loaded in loop cache 20 already and, if not, it is loaded. In either case, processing might continue at 120, rather than at 115.

Referring again to FIG. 3, at 115 if a loop is not found, processing continues, i.e., execution of the instruction(s) occurs as it would with sequential instructions. If a loop is found, at 120, the loop is fetched from loop cache 20, if possible (e.g., if the code exists in loop cache 20). Using the code existing in loop cache 20 provides a number of benefits, such as higher speed of operation (e.g., compared to using the main memory or storage circuits that are slower than loop cache 20), lower power consumption, as described above, or other advantages, such as those discussed above.

One aspect of the disclosure relates to determining the existence of loops before the execution stage. For example, a compiler or assembler might be used to detect the presence of loops in code, and to provide or use mechanisms to facilitate use of loop cache 20 during code execution.

Figure 4:
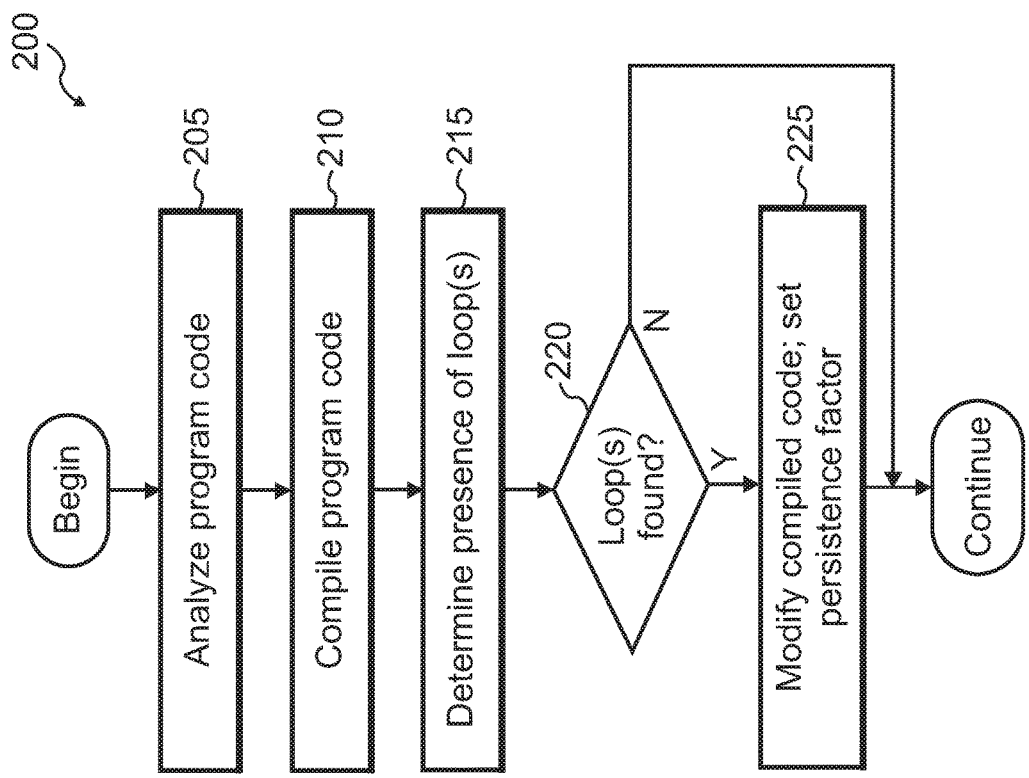
FIG. 4 depicts a flow diagram for a process of facilitating the use of a loop cache according to an exemplary embodiment.

FIG. 4 depicts a flow diagram 200 for a process of using a compiler to facilitating the use of a loop cache according to an exemplary embodiment. Although flow diagram 200 refers to using a compiler, other tools may be used, depending on available tools, technology, programming language used (machine level, assembly language, higher level programming language), as persons of ordinary skill in the art will understand. For example, with respect to assembly language, if the code is written in assembly language, then an assembler may be used, and the like.

Referring again to FIG. 4, at 205, the program code is analyzed. Generally speaking, compilers analyze the program code to assign variables, detect the presence of various structures, such as programming constructs (e.g., conditional statements (such as if/then/else), various operations (logic, assignment, arithmetic, etc.), and data structures (e.g., variables, constants, arrays, pointers, etc.). At 210, the program code is compiled. Compilation may be performed in a desired manner, as persons of ordinary skill in the art will understand. The details of the steps performed in the compilation process vary, depending on the programming language used, the attributes of the target hardware, and the like, as persons of ordinary skill in the art will understand. At 215, the output of the analysis and/or compilation of the program code is used to determine the presence of loops in the code. If a loop is found, the compiled code is modified to include structures or constructs that allow use of the loop cache when the loop code is executed. In some embodiments, for instance, flags, data structures, signals, tokens, etc. might be included in the compiled code to facilitate use of the loop cache by the processor at execution time.

As merely one example, in some embodiments, the compiler might insert a no-operation (NOP) instruction in the compiled code, together with a branch to the NOP instruction to indicate presence of a loop. Other possibilities exist, as persons of ordinary skill in the art will understand, and are contemplated, depending on factors such as performance specifications, technology available (compiler technology, hardware attributes, etc.), cost, complexity, etc. In some embodiments, the compiled code might also include a setting for the persistence factor. The setting might be static (e.g., predetermined), might be set depending on the type and/or number of loops identified in the code, might be based on simulation, heuristics, empirical data or information, etc.

Note that process flow diagram 200 provides merely an illustrative process for using a compiler to facilitate use of a loop cache. Alternatives exist and are contemplated. As merely one example, determining the presence of loops (labeled 215 and 220) and/or modifying the compiled code and (optionally) setting the persistence factor might be included in or combined with compiling the program code. In other words, those actions might be performed as part of the compilation process, as desired.

One aspect of the disclosure relates to management of loop cache 20. Management policy of loop cache 20 decides when some of the memory (storage space, such as buffer locations) of loop cache 20 is to be replaced or refreshed with other code. If loop cache 20 continually replaces its memory without acting as an efficient buffer for expected code accesses, it is said to be thrashing. Loop cache 20 typically includes relatively little storage capacity (e.g., memory locations or buffer locations). Thus, management of the use of loop cache 20 may be used to make loop cache 20 more effective in increasing the speed of execution of program code.

With respect to relatively simple loops, such as those discussed above, processors might provide hints or signals, particularly a signal indicating a jump is made back to a previous instruction, to help identify such loops. Thrashing can be avoided by having a relatively high confidence (compared, for example, to the case where the processor does not provide hints or signals) that the sequence being executed will be part of simple loop. More generally, the concept of persistence is meant to partially extend the utility of loop cache 20 to a greater number of more complex coding sequences. Generally, persistence refers to the number of times a branch identifying event is ignored before replacement of the contents of loop cache 20 occurs.

Depending on the complexity of tasks encoded in program code, execution of tasks may entail hundreds, thousands, or even millions of iterations. As data are considered in the loop iterations, the sequences may vary, but represent relatively small deviations of the same general flow (e.g., which branch of an if/then/else statement contained in a loop is taken). Persistence allows loop cache 20 to find more iterative or the most iterative, frequent loop, and allow the system to partially buffer code sequences or flows that might otherwise be beyond its memory capacity. According to empirical studies of an exemplary embodiment, using ULP-Bench simulation, using persistence can more than double the bufferable loop code over a simple loop cache (i.e., lacking persistence).

The amount of persistence may be indicated generally by a persistence factor. Persistence, using a persistence factor, may be implemented in a number of ways. Without loss of generality, one technique uses a persistence counter (or counter) that counts down from the persistence factor towards zero. As an alternative, in some embodiments, the persistence counter might start from an initial value (e.g., zero), and count up towards the persistence factor, as desired, by making modifications that will be apparent to persons of ordinary skill in the art.

Figure 5:
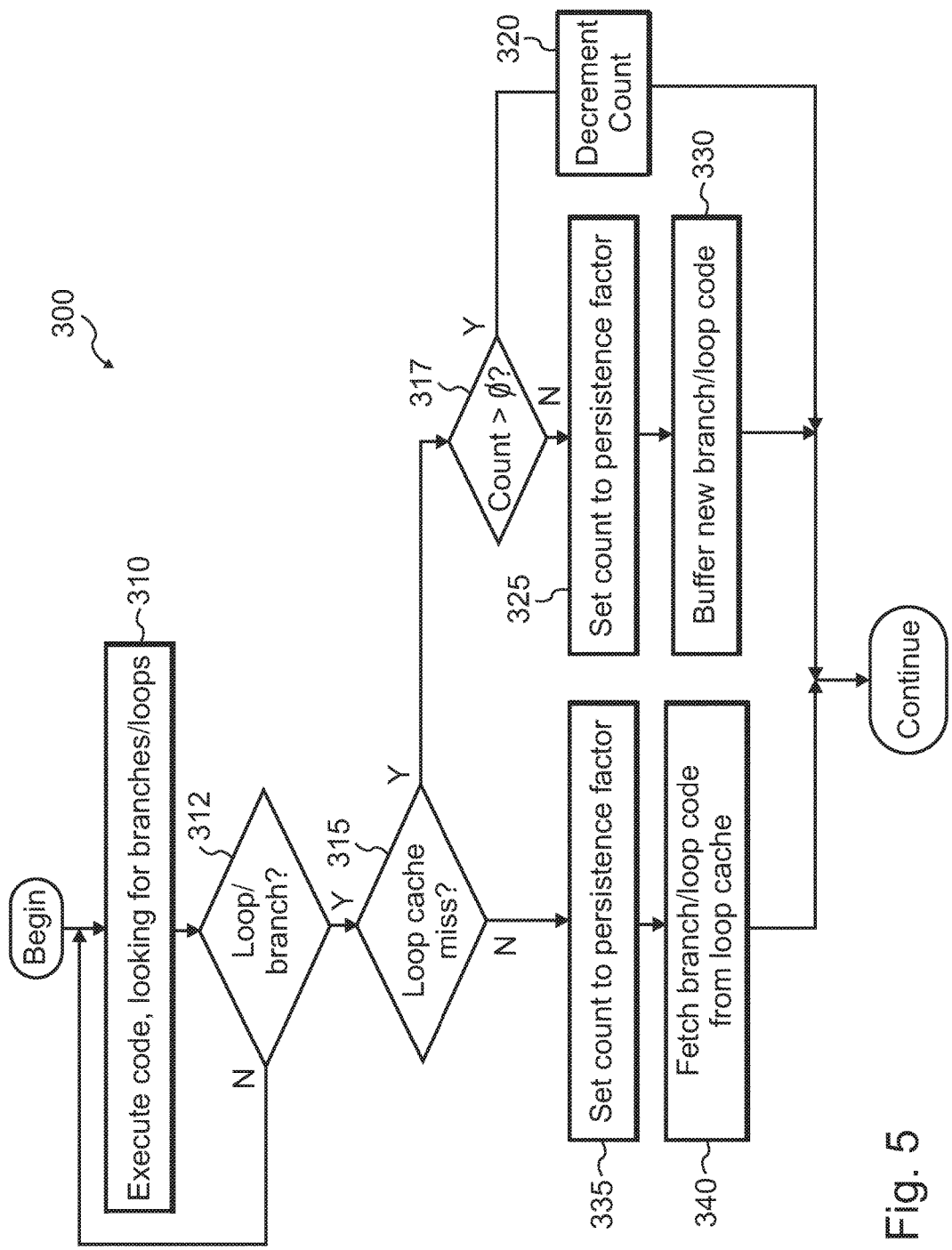
FIG. 5 illustrates a flow diagram for a process of using a loop cache according to an exemplary embodiment.

FIG. 5 illustrates a flow diagram 300 for using persistence factor according to an exemplary embodiment. Starting with the count set to initial value, for example, to the persistence factor, at 310, the code is executed, looking for branch identifying events, flags, hints, signals, etc. At 312 a determination is made whether loop or branch code is found. If not, control returns to 310 to execute code again. If loop or branch code is found, at 315 a determined is made whether a cache miss has occurred (if the accessed code is identified as not in loop cache 20). In the event of a cache miss, the process continues at 317, but in the event of a cache hit, the process continues at 335.

In the first case, at 317 (cache miss), a check is made whether the count is greater than zero. If so, at 320 the count is decremented (e.g., the persistence counter counts down). If not, the count is set to the persistence factor 325, and at 330 the buffer in loop cache 20 is filled with code representing the new branch or loop. Note that in some embodiments, rather than decrementing the count as described above, the count may be decremented on each loop-start (or branch-start) identifying event, as desired.

Referring again to FIG. 5, at 335 (cache hit) the count is set to the persistence factor 325. At 340, the branch or loop code is fetched from the loop cache (not shown), and used by the processor (not shown).

In some embodiments, the persistence factor is adjusted for a particular or given code or program, allowing performance to be tuned to the overall set of instructions in the code. In some embodiments, the persistence factor is set to a value determined (e.g., simulation, benchmarking, heuristics), and configured as a programmed and/or programmable factor. In some embodiments, the persistence factor may further be adjusted by the running code or program, e.g., after further experimentation or empirical information is gathered, for example, by running the code or program. Thus, a variety of techniques may be used to find and use an optical, improved value for the persistence factor.

Generally speaking, the persistence factor may be set in a static or dynamic fashion, or a combination of the two. For example, in some embodiments, empirical information, information from simulation, heuristics, and/or benchmarking may be used to statically set the persistence factor. In some embodiments, later, during execution, the persistence factor may be modified using information gathered from actual execution of the code. As another example, in some embodiments, information gathered or found during the compilation, assembly, etc. of the code may be used to set the persistence factor. As described above, loops may be identified during such procedures. Depending on the characteristics and attributes of loops in a given code or program, the persistence factor may be set.

In some embodiments, information regarding the characteristics and attributes of loops is combined with empirical information, information from simulation, heuristics, and/or benchmarking to set or modify the persistence factor. In some embodiments, later, during execution, the persistence factor may be modified using information gathered from actual execution of the code. In some embodiments, as noted above, the persistence factor may be set, modified, or adjusted during code execution based on information gathered during code execution, as described above.

Figure 6:
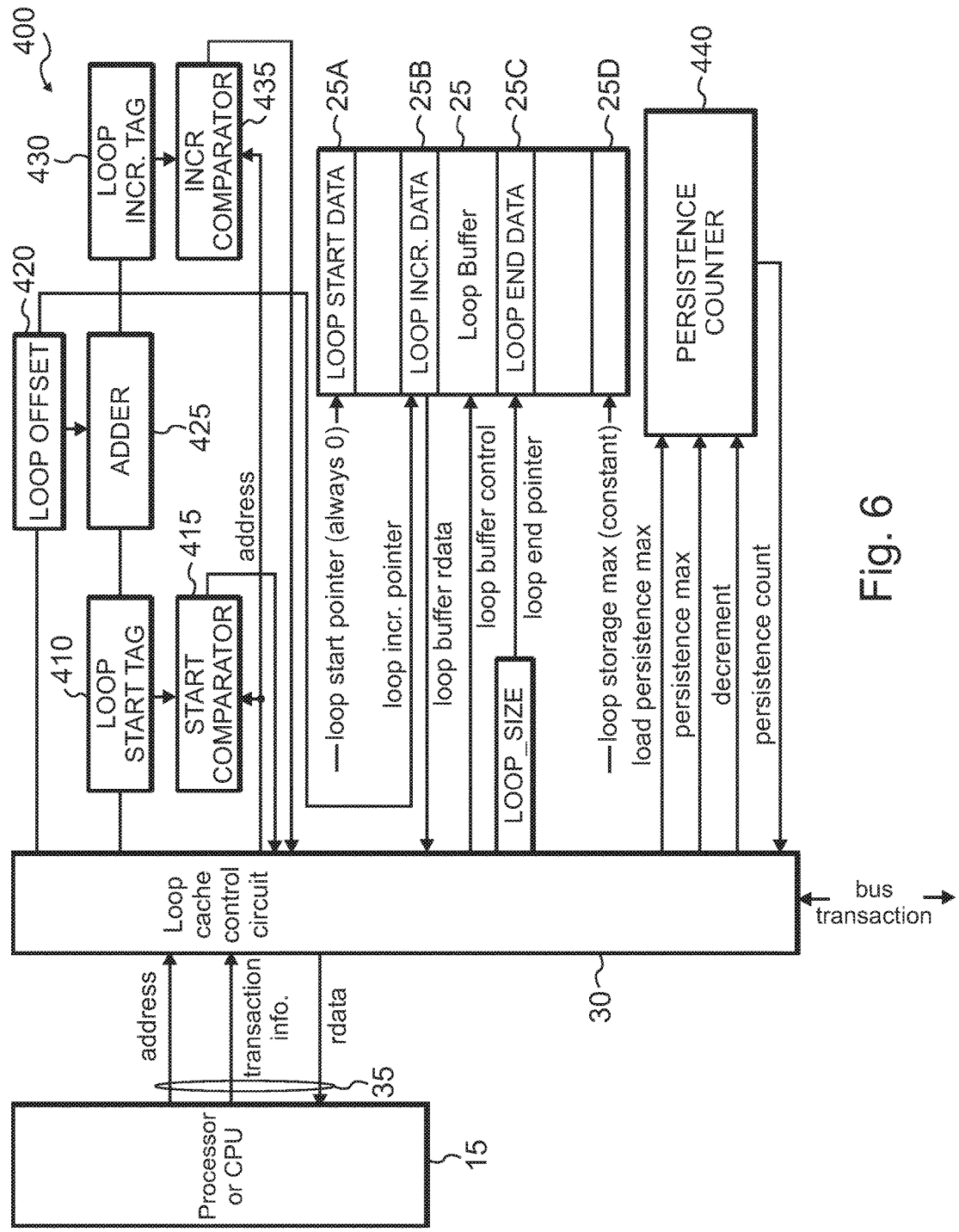
FIG. 6 depicts a circuit arrangement for a loop cache according to an exemplary embodiment.

FIG. 6 depicts a circuit arrangement 400 for a loop cache according to an exemplary embodiment. Circuit arrangement 400 in addition includes a processor or CPU 15, coupled to the loop cache using link 35, as described above. Link 35 includes "address," which is the address of the data being requested from the loop cache. "Transaction information" refers to data provided by processor 15 that can be used in addition to the address to create a loop identifying event (e.g. sequential signal, branch hints, etc.). Link 35 further includes "rdata," which denotes data read from the loop cache.

Loop cache control circuit (or control circuit) 30 controls the operation of the loop cache by signals from processor 15 and other loop cache blocks to control the overall behavior of buffer 25 (or loop buffer), counter (or persistence counter) 440, etc. In exemplary embodiments, control circuit 35 may implemented in a variety of ways, for instance, by using an FSM. Various quantities, addresses, pointers (e.g., LOOP OFFSET 420, LOOP START TAG 410, etc., may reside in storage locations, such as registers. LOOP OFFSET 420 denotes a pointer used to identify the location in buffer 25 of a sequential access from the last hit location in buffer 25. LOOP START TAG denotes the address that represents the start of a sequential run of addresses identified as a possible loop. START COMPARATOR 415 constitutes a block (e.g., a comparator) that compares the current transaction address with LOOP START TAG 410 to provide "address" to control circuit 30.

ADDER 425 adds LOOP OFFSET 420 and LOOP START TAG 410, and provides the sum to LOOP INCR TAG 430. LOOP INCR TAG 430 represents the address in memory of the data stored in buffer 25 at LOOP OFFSET 420 (the output of LOOP OFFSET 420 is "loop incr. pointer"). INCR COMPARATOR 435 compares the output of LOOP INCR TAG 430 and "address" from START COMPARATOR, and provides the results to control circuit 30. LOOP SIZE represents the maximum span of a sequential set of addresses. It is used by control circuit 30 to mark the maximum span of buffered contents of the loop.

Buffer 25 uses a number of pointers, described below. Pointer "loop start pointer" is a pointer to the first entry in buffer 25. Given that buffer 25 is loaded with what control circuit 30 considers the start of a loop, in the exemplary embodiment shown, the value of this pointer is zero. Pointer "loop incr pointer" has the same information as LOOP OFFSET 420, described above. Signals marked "loop buffer control" represent signals used by control circuit 30 to update entries within buffer 25. Pointer "loop end pointer" receives data from LOOP SIZE, and therefore has the same value.

Pointer "loop storage max (constant)" is a pointer to the end of buffer 25. In general, control circuit 30 uses this information to determine whether or when a loop has extended beyond the memory capacity of buffer 25. Signals marked "loop buffer rdata" represent information retrieved from buffer 25 and provided to control circuit 30. Pointer "LOOP START DATA" constitutes the first entry in buffer 25 representing the first word of data. Pointer "LOOP INCR DATA" represents the data pointed to by the "loop incr pointer"/LOOP OFFSET 420. Pointer "LOOP END DATA" represents the data pointed to by the "loop end pointer"/LOOP SIZE.

A number of signals are associated with the operation and control of counter (or persistence counter) 440. Signal "load persistence max" is active when counter 440 is to be loaded with the persistence factor, and occurs when loading a new loop or when the current buffered loop has been accessed. Signal "persistence max" denotes the largest value the count ever reaches or is expected to reach (typically the persistence factor). Signal "decrement" is active when the counter value is to be decremented. The signal is active when a loop start event occurs, constitutes a cache miss, and the persistence count has not reached zero. Signal "persistence count" represents a value used by control circuit 30 to decide if replacement of buffer 25 data is to occur or be skipped. Signal "bus transaction" may be used to retrieve data in the event of a loop cache miss. Specifically, in the event of a miss, control circuit 30 uses "bus transaction" to request and return the desired data to processor 15 from the next tier cache (not shown), main memory (not shown), etc.

Figure 7:
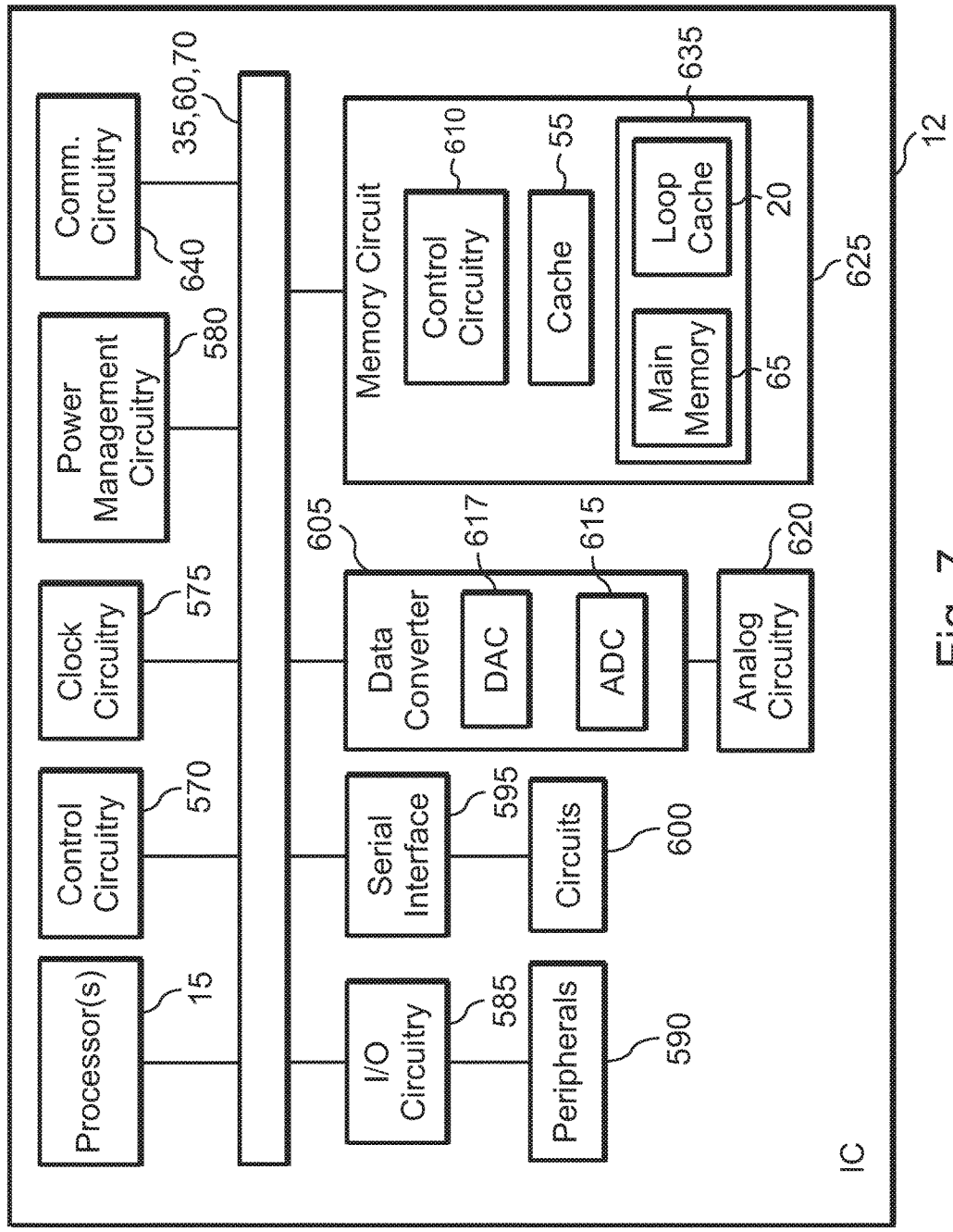
FIG. 7 illustrates a circuit arrangement for an IC, including a loop cache, according to an exemplary embodiment.

Loop caches according to exemplary embodiments may be combined with other circuitry, for example, by integrating the loop cache and signal processing, logic, arithmetic, and/or computing circuitry within an IC. FIG. 7 illustrates a circuit arrangement for an IC 12, including a loop cache 20, according to an exemplary embodiment, which combines the use of loop cache 20 with an MCU.

IC 12 includes a number of blocks (e.g., processor(s) 15, data converter 605, I/O circuitry 585, etc.) that communicate with one another using a link that might include links 35, 60, and/or 70 (see FIGS. 1-2) as a combined link (labeled "35, 60, 70" in FIG. 7). Referring again to FIG. 7, in exemplary embodiments, the combined link may constitute a coupling mechanism, such as a bus, interconnect, a set of conductors or semiconductors for communicating information, such as data, commands, status information, and the like. IC 12 may include the combined link coupled to one or more processors 15, clock circuitry 575, and power management circuitry 580. In some embodiments, processor(s) 15 may include circuitry or blocks for providing computing functions, such as CPUs, arithmetic-logic units (ALUs), and the like. In some embodiments, in addition, or as an alternative, processor(s) 15 may include one or more digital signal processors (DSPs). The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 12. Clock circuitry 575 may also control the timing of operations that use the combined link. In some embodiments, clock circuitry 575 may provide one or more clock signals via the combined link to other blocks in IC 12. In some embodiments, power management circuitry 580 may reduce an apparatus's (e.g., IC 12) clock speed, turn off the clock, reduce power, turn off power, or any combination of the foregoing with respect to part of a circuit or all components of a circuit. Further, power management circuitry 580 may turn on a clock, increase a clock rate, turn on power, increase power, or any combination of the foregoing in response to a transition from an inactive state to an active state (such as when processor(s) 15 make a transition from a low-power or idle or sleep state to a normal operating state).

The combined link may couple to one or more circuits 600 through serial interface 595. Through serial interface 595, one or more circuits coupled to the combined link may communicate with circuits 600. Circuits 600 may communicate using one or more serial protocols, e.g., SMBUS, I2C, SPI, and the like, as persons of ordinary skill in the art will understand. The combined link may couple to one or more peripherals 590 through I/O circuitry 585. Through I/O circuitry 585, one or more peripherals 590 may couple to the combined link and may therefore communicate with other blocks coupled to the combined link, e.g., processor(s) 365, memory circuit 625, etc. In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 12. Examples include keypads, speakers, and the like.

In some embodiments, with respect to some peripherals, I/O circuitry 585 may be bypassed. In such embodiments, some peripherals 590 may couple to and communicate with the combined link without using I/O circuitry 585. Note that in some embodiments, such peripherals may be external to IC 12, as described above. The combined link may couple to analog circuitry 620 via data converter 605. Data converter 405 may include one or more ADCs 20 and/or one or more DACs 617. The ADC(s) 20 receive analog signal(s) from analog circuitry 620, and convert the analog signal(s) to a digital format, which they communicate to one or more blocks coupled to the combined link. Conversely, DAC(s) 617 receive one or more digital signals from one or more blocks coupled to the combined link, and convert the digital signal(s) to an analog format. The analog signal(s) may be provided to circuitry within (e.g., analog circuitry 620) or circuitry external to IC 12, as desired.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 12 to form more complex systems, sub-systems, control blocks, and information processing blocks, as desired.

Control circuitry 570 couples to the combined link. Thus, control circuitry 570 may communicate with and/or control the operation of various blocks coupled to the combined link. In addition or as an alternative, control circuitry 570 may facilitate communication or cooperation between various blocks coupled to the combined link. In some embodiments, the functionality or circuitry of control circuit 30 (see FIGS. 1-2 and 6) may be combined with or included with the functionality or circuitry of control circuitry 570, as desired. Referring again to FIG. 7, in some embodiments, control circuitry 570 may initiate or respond to a reset operation. The reset operation may cause a reset of one or more blocks coupled to the combined link, of IC 12, etc., as person of ordinary skill in the art will understand. For example, control circuitry 570 may cause loop cache 20 to reset to an initial state. In exemplary embodiments, control circuitry 570 may include a variety of types and blocks of circuitry. In some embodiments, control circuitry 570 may include logic circuitry, FSMs, or other circuitry to perform a variety of operations, such as the operations described above.

Communication circuitry 640 couples to the combined link and also to circuitry or blocks (not shown) external to IC 12. Through communication circuitry 640, various blocks coupled to the combined link (or IC 12, generally) can communicate with the external circuitry or blocks (not shown) via one or more communication protocols. Examples include universal serial bus (USB), Ethernet, and the like. In exemplary embodiments, other communication protocols may be used, depending on factors such as specifications for a given application, as person of ordinary skill in the art will understand.

As noted, memory circuit 625 couples to the combined link. Consequently, memory circuit 625 may communicate with one or more blocks coupled to the combined link, such as processor(s) 365, control circuitry 570, I/O circuitry 585, etc. In the embodiment shown, memory circuit 625 includes control circuitry 610, cache 55, main memory 65, and loop cache 20, as described above. Control circuitry 610 controls or supervises various operations of memory circuit 625. For example, control circuitry 610 may provide a mechanism to perform memory read or write operations via the combined link. In exemplary embodiments, control circuitry 610 may support various protocols, such as double data rate (DDR), DDR2, DDR3, and the like, as desired.

In some embodiments, the memory read and/or write operations involve the use of one or more blocks in IC 12, such as processor(s) 15. DMA 630 allows increased performance of memory operations in some situations. More specifically, DMA 630 provides a mechanism for performing memory read and write operations directly between the source or destination of the data and memory circuit 625, rather than through blocks such as processor(s) 15.

As persons of ordinary skill in the art will understand, one may apply the disclosed concepts effectively to various types, arrangements, or configurations of IC. Examples described in this document, such as ICs containing MCU(s), constitute merely illustrative applications, and are not intended to limit the application of the disclosed concepts to other ICs by making appropriate modifications. Those modifications will fall within the knowledge and level of skill of persons of ordinary skill in the art.

According to one aspect of the disclosure, one may perform, run, or execute the disclosed algorithms, processes, methods, or software on computer systems, devices, processors, controllers, etc. FIG. 8 shows a block diagram of an exemplary system 1000 for processing information that may be used in exemplary embodiments. For example, in some embodiments, system 1000 may be used to realize or implement one or more of compilers, assemblers, simulation systems, benchmarking systems, etc., as for instance described above in connection with various embodiments. System 1000, or modifications or variations of it as persons of ordinary skill in the art will understand, may be used to run or perform processes used in the disclosed concepts, for instance, as used in exemplary embodiments.

System 1000 includes a computer device 1005, an input device 1010, a video/display device 1015, and a storage/output device 1020, although one may include more than one of each of those devices, as desired. Computer device 1005 couples to input device 1010, video/display device 1015, and storage/output device 1020. System 1000 may include more than one computer device 1005, for example, a set of associated computer devices or systems, as desired. Typically, system 1000 operates in association with input from a user. The user input typically causes system 1000 to perform specific desired information-processing tasks, such as those described above. System 1000 in part uses computer device 1005 to perform those tasks. Computer device 1005 includes information-processing circuitry, such as a central-processing unit (CPU), controller, microcontroller unit (MCU), etc., although one may use more than one such device or information-processing circuitry, as persons skilled in the art would understand.

Input device 1010 receives input from the user and makes that input available to computer device 1005 for processing. The user input may include data, instructions, or both, as desired. Input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to computer device 1005. Similarly, the user operates the pointing device to provide cursor position or control information to computer device 1005. Video/display device 1015 displays visual images to the user. Video/display device 1015 may include graphics circuitry, such as graphics processors, as desired. The visual images may include information about the operation of computer device 1005, such as graphs, pictures, images, and text. Video/display device 1015 may include a computer monitor or display, a projection device, and the like, as persons of ordinary skill in the art would understand. If system 1000 uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may include a magnetic, optical, semiconductor, or magneto-optical drive capable of storing information on a desired medium and in a desired format. As another example, storage/output device 1020 may constitute a printer, plotter, or other output device to generate printed or plotted expressions of the information from computer device 1005. In some embodiments, in addition or as an alternative to storing information, storage device 1020 may provide information (e.g., previously stored information) to one or more components or parts of system 1000, for example, computer device 1005.

Computer-readable medium 1025 (or computer program product) interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures, databases, and/or file systems). When stored, encoded, recorded, and/or embodied by computer-readable medium 1025, the functional descriptive material imparts functionality. The functional descriptive material interrelates to computer-readable medium 1025. In some embodiments, computer-readable medium 1025 is non-transitory, as desired. Information structures within the functional descriptive material define structural and functional interrelations between the information structures and computer-readable medium 1025 and/or other aspects of system 1000. These interrelations permit the realization of the information structures' functionality.

Moreover, within such functional descriptive material, computer programs define structural and functional interrelations between the computer programs and computer-readable medium 1025 and other aspects of system 1000. These interrelations permit the realization of the computer programs' functionality. Thus, in a general sense, computer-readable medium 1025 includes information, such as instructions, that when executed by computer device 1005, cause computer device 1005 (system 1000, generally) to provide the functionality prescribed by a process, computer program, software, firmware, method, algorithm, etc., as included (partially or entirely) in computer-readable medium 1025.

By way of illustration, computer device 1005 reads, accesses, or copies functional descriptive material into a computer memory (not shown explicitly in the figure) of computer device 1005 (or a separate block or memory circuit coupled to computer device 1005, as desired). Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations. Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional or desired tasks or operations.

Note that one may implement computer-readable medium 1025 in a variety of ways, as persons of ordinary skill in the art would understand. For example, memory within computer device 1005 (and/or external to computer device 1005) may constitute a computer-readable medium 1025, as desired. Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired. In addition, input(s) and/or output(s) of system 1000 may be received from, or provided to, one or more networks (not shown), as desired.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
 a processor to execute instructions; and
 a loop cache coupled to the processor to provide to the processor instructions corresponding to a loop in the instructions, the loop cache comprising a persistence counter, wherein the persistence counter uses a number of times a branch identifying event is ignored before replacement of contents of the loop cache occurs.

2. The apparatus according to claim 1, wherein the persistence counter has a corresponding count value, and wherein contents of the loop cache are replaced when the count value reaches zero.

3. The apparatus according to claim 1, wherein the persistence counter starts counting from an initial persistence factor.

4. The apparatus according to claim 3, wherein the persistence counter counts down depending on whether a loop cache miss occurs.

5. The apparatus according to claim 1, wherein the loop cache is filled with instructions corresponding to a loop when existence of a loop within the instructions is determined.

6. The apparatus according to claim 5, wherein the existence of the loop within the instructions is determined by the processor.

7. The apparatus according to claim 5, wherein the existence of the loop within the instructions is determined by at least one flag included in the instructions.

8. The apparatus according to claim 3, wherein the persistence factor is static during execution of the instructions.

9. The apparatus according to claim 3, wherein the persistence factor is changed dynamically during execution of the instructions.

10. The apparatus according to claim 3, wherein the persistence factor is determined empirically.

11. A microcontroller unit (MCU) comprising:
 a processor to receive and execute a set of instructions;
 a loop cache, comprising:
  a storage circuit to store instructions corresponding to a loop in the set of instructions; and
  a persistence counter to count down from a persistence factor, wherein the persistence counter uses a number of times a branch identifying event is ignored before replacement of contents of the loop cache occurs.

12. The MCU according to claim 11, wherein the storage circuit comprises a buffer.

13. The MCU according to claim 11, wherein the loop cache further comprises a control circuit coupled to the processor and to the loop cache to facilitate transfer of information between the processor and the loop cache.

14. The MCU according to claim 11, wherein the persistence counter counts down depending on whether a loop cache miss occurs.

15. The MCU according to claim 11, further comprising at least one of a main memory and a cache to provide instructions corresponding to the loop in the set of instructions in the event of a loop cache miss.

16. A method of processing information, the method comprising:

executing instructions using a processor;

using a loop cache to provide to the processor instructions corresponding to a loop in the instructions by using a persistence counter, wherein the persistence counter uses a number of times a branch identifying event is ignored before replacement of contents of the loop cache occurs.

17. The method according to claim 16, further comprising counting down, using the persistence counter, from a persistence factor.

18. The method according to claim 17, wherein counting down, using the persistence counter, from the persistence factor further comprises counting down depending on whether a loop cache miss occurs.

19. The method according to claim 17, further comprising using a static persistence factor.

20. The method according to claim 17, further comprising using a dynamic persistence factor.

\* \* \* \* \*